US012609948B2

(12) United States Patent
Kanemoto et al.

(10) Patent No.: US 12,609,948 B2
(45) Date of Patent: Apr. 21, 2026

(54) EXTRACTING DEVICE, EXTRACTING METHOD, AND EXTRACTING PROGRAM

(71) Applicant: NTT, Inc., Tokyo (JP)

(72) Inventors: Yo Kanemoto, Musashino (JP); Toshiki Shibahara, Musashino (JP); Mitsuaki Akiyama, Musashino (JP)

(73) Assignee: NTT, Inc., Tokyo (JP)

( * ) Notice: Subject to any disclaimer, the term of this patent is extended or adjusted under 35 U.S.C. 154(b) by 158 days.

(21) Appl. No.: 18/271,059

(22) PCT Filed: Jan. 8, 2021

(86) PCT No.: PCT/JP2021/000509
§ 371 (c)(1),
(2) Date: Jul. 6, 2023

(87) PCT Pub. No.: WO2022/149265
PCT Pub. Date: Jul. 14, 2022

(65) Prior Publication Data
US 2024/0305656 A1 Sep. 12, 2024

(51) Int. Cl.
*H04L 9/40* (2022.01)
*G06Q 10/0631* (2023.01)
*G06Q 10/0633* (2023.01)
*G06Q 10/10* (2023.01)

(52) U.S. Cl.
CPC ... *H04L 63/1425* (2013.01); *G06Q 10/06312* (2013.01); *G06Q 10/0633* (2013.01); *G06Q 10/10* (2013.01)

(58) Field of Classification Search
CPC ... G06F 11/3082; G06F 11/3495; H04L 67/12
See application file for complete search history.

(56) References Cited

U.S. PATENT DOCUMENTS

| | | | | |
|---|---|---|---|---|
| 7,974,849 | B1 * | 7/2011 | Begole | G06Q 10/10 |
| | | | | 709/224 |
| 12,237,089 | B2 * | 2/2025 | Schein | G08B 21/182 |
| 2008/0148398 | A1 * | 6/2008 | Mezack | G06F 21/552 |
| | | | | 709/224 |
| 2013/0006718 | A1 * | 1/2013 | Nielsen | G06Q 10/06312 |
| | | | | 705/7.42 |
| 2013/0222387 | A1 * | 8/2013 | Bradshaw | G06T 11/206 |
| | | | | 345/440 |

(Continued)

OTHER PUBLICATIONS

Zhong et al., "Learning from Experts' Experience: Towards Automated Cyber Security Data Triage", IEEE 2nd International Conference on Big Data Security on Cloud (BigDataSecurity), 2016, pp. 1-10.

(Continued)

*Primary Examiner* — Barbara B Anyan
(74) *Attorney, Agent, or Firm* — XSENSUS LLP

(57) ABSTRACT

An extraction device includes processing circuitry configured to collect, from an operating system (OS) of a computer operated by each of operators, an operation log indicating an operation of the computer of each of the operators when each of the operators operates the computer to conduct an investigation, and extract a series of operations common to the operators from collected operation logs of the operators and output the extracted series of operations.

19 Claims, 14 Drawing Sheets

(56) References Cited

U.S. PATENT DOCUMENTS

| | | | | |
|---|---|---|---|---|
| 2016/0041068 A1* | 2/2016 | Wascat | .................. | G01D 21/00 |
| | | | | 702/39 |
| 2016/0164975 A1* | 6/2016 | Seo | ........................ | H04L 67/12 |
| | | | | 707/752 |
| 2016/0292373 A1* | 10/2016 | Spors | ................ | G06Q 10/0633 |
| 2018/0349517 A1* | 12/2018 | Kleiman-Weiner | ... | G06N 5/022 |
| 2019/0182343 A1* | 6/2019 | Lodha | ................ | G06F 11/3495 |
| 2022/0405419 A1* | 12/2022 | Joshi | .................. | G06F 11/3082 |

OTHER PUBLICATIONS

Kanemoto et al., "Extracting Common Behavior of SOC Analysts for Efficient Security Operation", Oct. 19, 2020, 26 pages.
Kanemoto et al., "Extracting Common Behavior of SOC Analysts for Efficient Security Operation", Symposium, Information Processing Society of Japan, Oct. 19, 2020, pp. 1-2.
Kanemoto et al., "Extracting Common Behavior of SOC Analysts for Efficient Security Operation", NTT Secure Platform Laboratories, Oct. 19, 2020, 8 pages.
Kanemoto et al., "Extracting Common Behavior of SOC Analysts for Efficient Security Operation", Computer Security Symposium, Available Online at: https://www.iwsec.org/css/2020/outline.html, Oct. 19, 2020, pp. 1-2.

* cited by examiner

Fig. 4

| OPERATION | | SUPPLEMENTARY INFORMATION | ACQUISITION TARGET |
|---|---|---|---|
| MOUSE CLICK | click | × TIME<br>× BUTTON (LEFT or RIGHT)<br>× SCREEN COORDINATE POSITION<br>× CLICK TARGET<br>× CLICK TARGET SCREEN | window<br>browser |
| KEY INPUT | key | × TIME<br>× INPUT CHARACTER STRING | window<br>browser |
| TEXT SELECTION | select | × TIME<br>× SELECTED CHARACTER STRING | window<br>browser |
| COPY, CUT, PASTE | copy, cut, paste | × TIME<br>× TARGET CHARACTER STRING | window<br>browser |
| SCROLL | scroll | × TIME<br>× SCROLL RATE | window<br>browser |
| CHANGE WINDOW OF INTEREST | window | × TIME<br>× TITLE OF WINDOW | window |
| BROWSE PAGE | page | × TIME<br>× URL | browser |
| CHANGE TAB OF INTEREST | tab | × TIME<br>× URL OF Web PAGE BROWSED ON TAB | browser |

| Alert window | × − + |
|---|---|

Alert #1
− Network attack
− IP address: 1.2.3.4

_502_

| Search window | × − + |
|---|---|

Threat Intelligence search: [          ]

[ submit ]

_503_

{ts: 2020−09−10−00:00:00, type: "window", target: "Alert window"]
{ts: 2020−09−10−00:00:04, type: "select", target: "1.2.3.4"]
{ts: 2020−09−10−00:00:06, type: "copy", target: "1.2.3.4"]
{ts: 2020−09−10−00:00:08, type: "window", target: "Search window"]
{ts: 2020−09−10−00:00:09, type: "paste", target: "search"]
{ts: 2020−09−10−00:00:010, type: "click", target: "submit"]

| OPERATION CONTENT | ABSTRACTION CONTENT |
|---|---|
| TIME | ERASE |
| NUMBER | REPLACE WITH CODE REPRESENTING NUMBER |
| SELECTED CHARACTER STRING | CONVERT INTO CODE REPRESENTING CHARACTER STRING TYPE (EXAMPLE : 1.2.3.4 --> IP ADDRESS) |

802

| BEFORE CONVERSION | AFTER CONVERSION |
|---|---|
| {ts: 2020-09-10-00:00:00, type: "window", target: "Alert window"} | {type: "window", target: "Alert window"} |
| {ts: 2020-09-10-00:00:04, type: "select", target: "1.2.3.4"} | {type: "select", target: "1.2.3.4"} |

803

| BEFORE CONVERSION | AFTER CONVERSION |
|---|---|
| {type: "window", target: "Alert window"} | Window_1 |
| {type: "select", target: "1.2.3.4"} | Select_1 |

Fig. 9

| OPERATOR | OPERATION SEQUENCE |
|---|---|
| A | [Window_1, Select_1, Copy_1, Window_2, Paste_1, Click_1] |
| B | [Window_1, Click_2, Click_3, Select_1, Copy_1, Window_2, Paste_1, Click_1] |
| C | [Window_1, Window_3, Select_1, Copy_1, Window_2, Paste_1, Click_1] |

↓ COMMON OPERATION SEQUENCE

C = [Window_1, Select_1, Copy_1, Window_2, Paste_1, Click_1]

Fig. 10

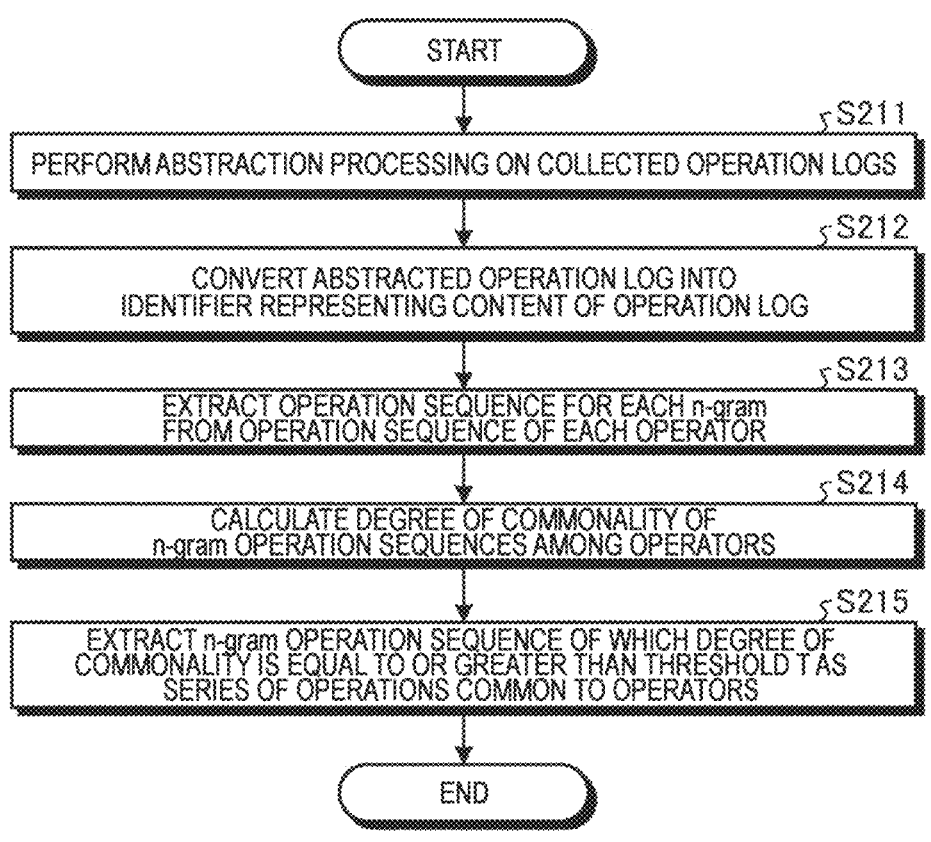

START

S211
PERFORM ABSTRACTION PROCESSING ON COLLECTED OPERATION LOGS

S212
CONVERT ABSTRACTED OPERATION LOG INTO
IDENTIFIER REPRESENTING CONTENT OF OPERATION LOG

S213
EXTRACT OPERATION SEQUENCE FOR EACH n-gram
FROM OPERATION SEQUENCE OF EACH OPERATOR S214
CALCULATE DEGREE OF COMMONALITY OF
n-gram OPERATION SEQUENCES AMONG OPERATORS S215
EXTRACT n-gram OPERATION SEQUENCE OF WHICH DEGREE OF
COMMONALITY IS EQUAL TO OR GREATER THAN THRESHOLD T AS
SERIES OF OPERATIONS COMMON TO OPERATORS

END

| OPERATOR | OPERATION SEQUENCE |
|---|---|
| A | [Window_1, Select_1, Copy_1, Window_2, Paste_1, Click_1] |
| B | [Window_1, Click_2, Click_3, Select_1, Copy_1, Window_2, Paste_1, Click_1] |
| C | [Window_1, Window_3, Select_1, Copy_1, Window_2, Paste_1, Click_1] |

112

| n-gram OPERATION SEQUENCE | COMMONALITY |
|---|---|
| [Window_1, Select_1, Copy_1] | 1/3 |
| [Select_1, Copy_1, Window_2] | 3/3 |
| [Copy_1, Window_2, Paste_1] | 3/3 |
| [Window_2, Paste_1, Click_1] | 3/3 |
| [Window_1, Click_2, Click_3] | 1/3 |
| [Click_2, Click_3, Select_1] | 1/3 |
| [Click_3, Select_1, Copy_1] | 1/3 |
| [Window_1, Window_3, Select_1] | 1/3 |
| [Window_3, Select_1, Copy_1] | 1/3 |

113

| [Select_1, Copy_1, Window_2] | 3/3 |
|---|---|
| [Copy_1, Window_2, Paste_1] | 3/3 |
| [Window_2, Paste_1, Click_1] | 3/3 |

| OPERATOR | OPERATION SEQUENCE |
|---|---|
| A | [Window_1, Select_1, Copy_1, Window_2, Paste_1, Click_1] |
| B | [Window_1, Click_2, Click_3, Select_1, Copy_1, Window_2, Paste_1, Click_1] |
| C | [Window_1, Window_3, Select_1, Copy_1, Window_2, Paste_1, Click_1] |

1301

↓ STATE TRANSITION MODEL

1302

START
(S) Window_1 (3)

Window_3 (1)
Select_1 (1)
Click_2 (1)

Select_1 (1)
Copy_1 (3)
Click_3 (1)

Window_2 (3)
Paste_1 (3)
Click_1 (3)
(T) END

↓ REGULAR EXPRESSION

1303

[Window_1, *, Select_1, Copy_1, Window_2, Paste_1, Click_1]

EXTRACTING DEVICE, EXTRACTING METHOD, AND EXTRACTING PROGRAM

CROSS-REFERENCE TO RELATED APPLICATION

The present application is based on PCT filing PCT/JP2021/000509, filed Jan. 8, 2021, the entire contents of which are incorporated herein by reference.

TECHNICAL FIELD

The present invention relates to an extraction device, an extraction method, and an extraction program for extracting a series of operations common to a plurality of operators.

BACKGROUND ART

In security and network operations, in order to determine whether or not there is a security breach or a network failure, a human who is an operator investigates logs acquired from various devices.

These investigations may or may not show a clear procedure. That is, some investigation procedures performed by the operator exist as implicit knowledge. Given the overall efficiency of conducting an investigation by a team or a plurality of operators, it is desirable that the investigation procedure be clarified. Therefore, it is desirable that the investigation procedure existing as implicit knowledge also be clarified.

Here, as a technology for clarifying an investigation procedure, there is a technology (see Non Patent Literature 1) in which a log (operation log) of an operation of a computer is recorded when an operator conducts an investigation using the computer, and a behavior model when the operator conducts an investigation is created on the basis of the recorded operation log. In addition, there is a robotic process automation (RPA) technology (see Non Patent Literature 2) in which an operation of a computer by an operator is recorded as it is.

CITATION LIST

Non Patent Literature

Non Patent Literature 1: Zhong, Chen, et al., "Learning from Experts' Experience: Towards Automated Cyber Security Data Triage", IEEE 2nd International Conference on Big Data Security on Cloud (BigDataSecurity) 2016.

Non Patent Literature 2: What is robotic process automation (RPA)? Summarizing and explaining from the basic to how to proceed with introduction, [online], [Searched on Dec. 9, 2020], Internet <URL: winactor.com/column/about_rpa>

SUMMARY OF INVENTION

Technical Problem

However, the technology described in Non Patent Literature 1 is not for general purpose use because it is necessary to use a unique graphical user interface (GUI) operation tool. In addition, the technology described in Non Patent Literature 2 merely records an operation of a computer by an individual operator as it is, and does not clarify an investigation procedure shared as implicit knowledge among a plurality of operators.

Therefore, an object of the present invention is to solve the above-described problem and clarify an investigation procedure shared as implicit knowledge among a plurality of operators without using a unique GUI operation tool.

Solution to Problem

In order to solve the above problems, an extraction device according to the present invention includes: processing circuitry configured to: collect, from an operating system (OS) of a computer operated by each of operators, an operation log indicating an operation of the computer of each of the operators when each of the operators operates the computer to conduct an investigation; and extract a series of operations common to the operators from collected operation logs of the operators and output the extracted series of operations.

Advantageous Effects of Invention

According to the present invention, it is possible to clarify a procedure shared as implicit knowledge among a plurality of operators without using a unique GUI operation tool.

BRIEF DESCRIPTION OF DRAWINGS

FIG. 4 is a diagram illustrating an example of operations acquired by the collection unit of FIG. 3 and acquisition targets of the operation.

FIG. 5 is a diagram for describing an example of an operation log.

FIG. 8 is a diagram for describing operation log abstraction processing.

FIG. 9 is a diagram for describing processing of obtaining a common operation sequence C by applying a longest substring (LCS) to each operation sequence of operators A, B, and C a plurality of times.

FIG. 10 is a flowchart illustrating an example of a processing procedure of an extraction device of a second embodiment.

FIG. 11 is a diagram for describing an example of processing of the extraction device of the second embodiment.

DESCRIPTION OF EMBODIMENTS

Hereinafter, modes (embodiments) for carrying out the present invention will be described separately from a first embodiment to a third embodiment with reference to the drawings. The present invention is not limited to the above embodiments.

Figure 1:
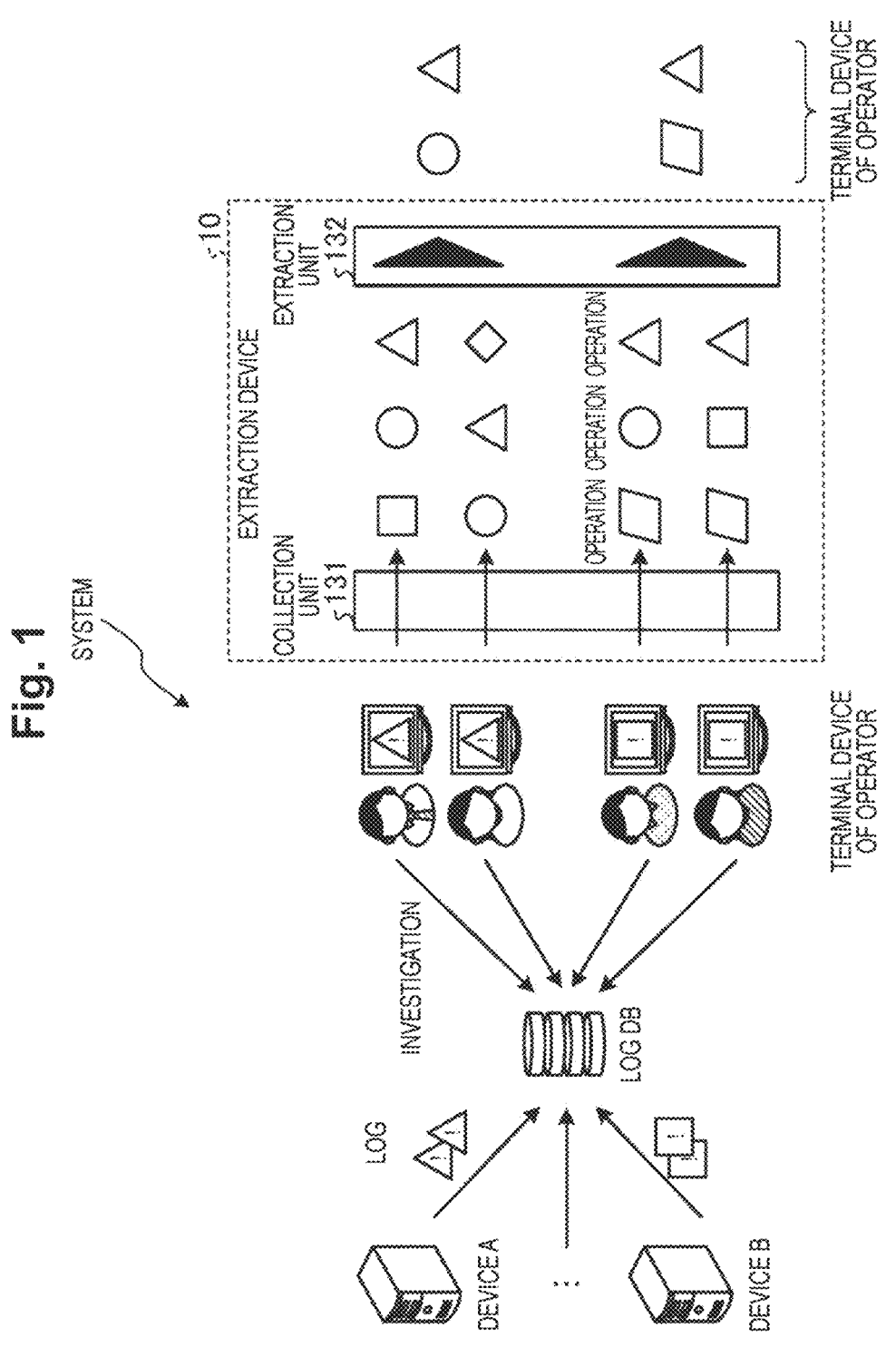
FIG. 1 is a diagram illustrating a configuration example of a system including an extraction device of a first embodiment.

First Embodiment First, a configuration example of a system including an extraction device according to a first embodiment will be described with reference to FIG. 1. A system includes, for example, a log DB that accumulates logs of security devices and network devices (devices A, B), a terminal device of an operator who performs an investigation using the logs accumulated in the log DB, and an extraction device 10.

The extraction device 10 collects operation logs indicating an operation of a terminal device of each operator at the time of investigating the log. Then, the extraction device 10 extracts a series of operations common to the operators from the collected operation log of each operator, and outputs the series of operations.

Figure 2:
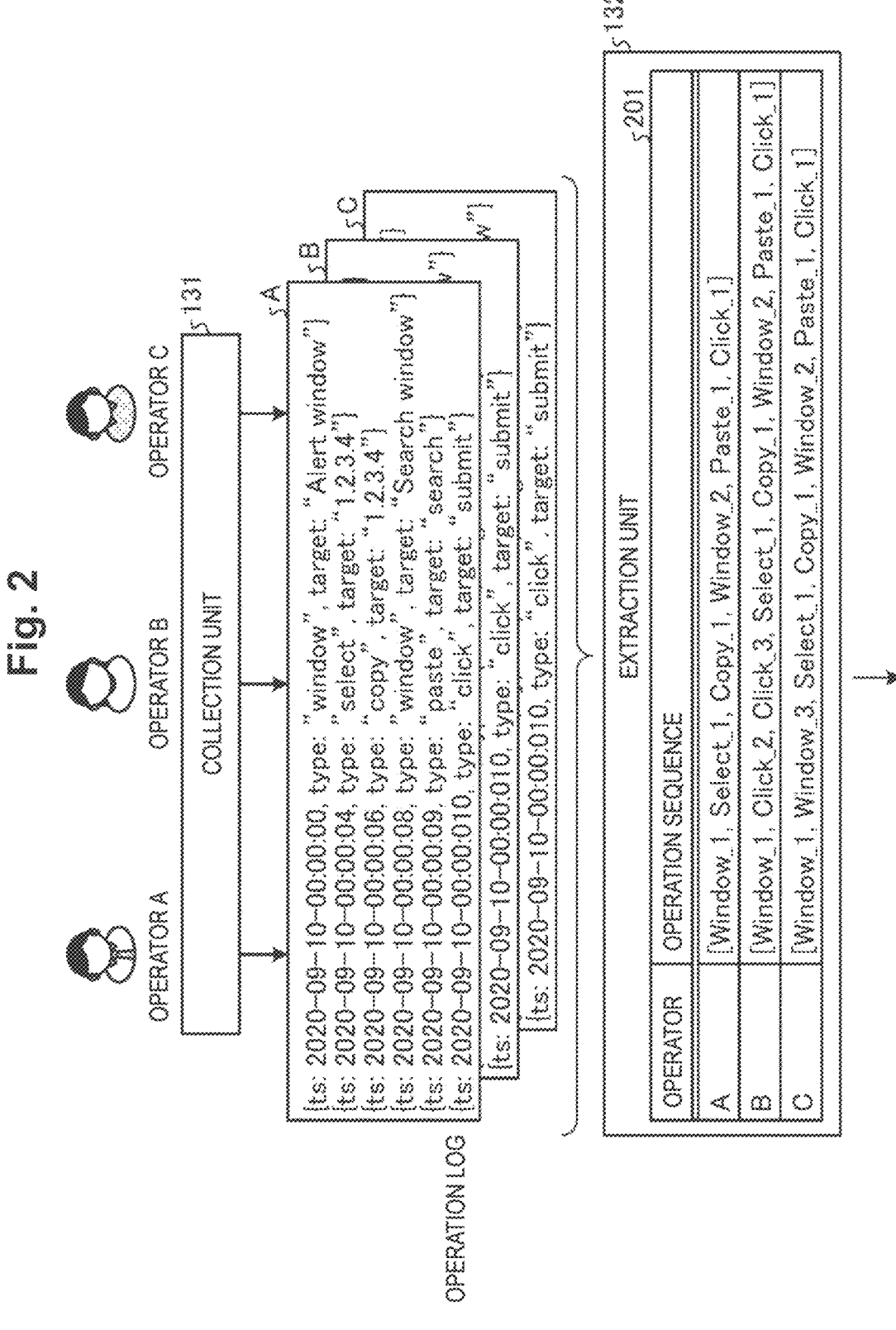
FIG. 2 is a diagram for describing an outline of an operation of the extraction device of the first embodiment.

For example, as illustrated in FIG. 2, a collection unit 131 of the extraction device 10 collects operation logs (operation logs A, B, C) of terminal devices of operators A, B, and C at the time of investigation. Thereafter, an extraction unit 132 of the extraction device 10 abstracts an operation indicated by the collected operation log of each of the operators A, B, and C, and creates an operation sequence for each of the operators A, B, and C. Then, the extraction unit 132 extracts a series of operations common to the operation sequences of the operators A, B, and C. For example, the extraction unit 132 extracts a series of operations common to the operators A, B, and C by applying the longest common subsequence to the operation sequence of each of the operators A, B, and C.

As a result, the extraction device 10 can clarify an operation procedure shared as implicit knowledge among a plurality of operators without using a unique GUI operation tool.

Figure 3:
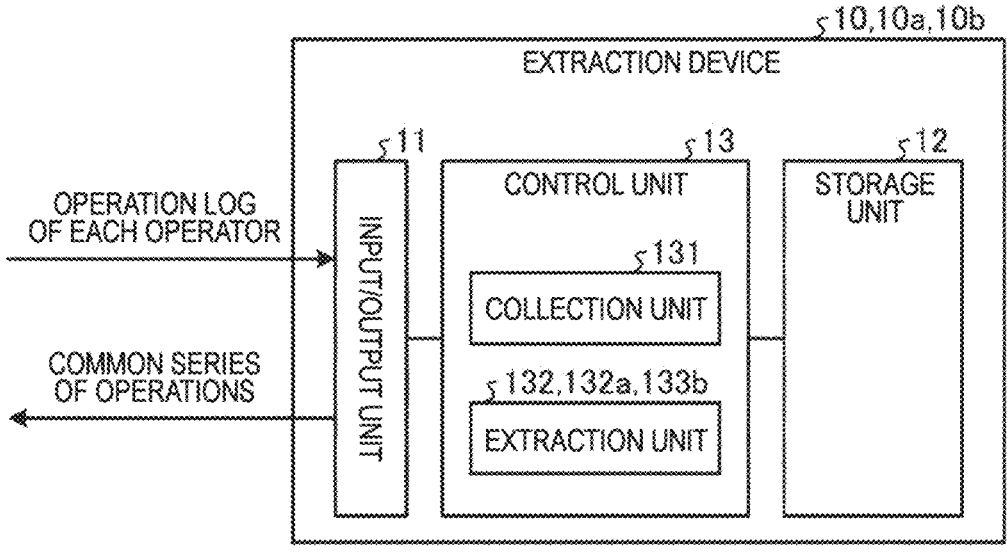
FIG. 3 is a diagram illustrating a configuration example of the extraction device according to the embodiments.

Next, a configuration example of an extraction device 10 will be described with reference to FIG. 3. Note that an extraction device 10a and an extraction unit 132a will be described in a second embodiment. In addition, an extraction device 10b and the extraction unit 132b will be described in a third embodiment.

The extraction device 10 includes an input/output unit 11, a storage unit 12, and a control unit 13. The input/output unit 11 controls input/output of various data. For example, the input/output unit 11 accepts input of an operation log of each operator and outputs an extraction result of a series of operations common to the operators. The storage unit 12 stores information to be referred to when the control unit 13 executes various types of processing.

The control unit 13 has overall control of the extraction device 10. The control unit 13 includes the collection unit 131 and the extraction unit 132. The collection unit 131 collects operation logs indicating an operation of the terminal device of each operator at the time of investigating the log.

For example, the collection unit 131 uses a window function of an operating system (OS) of the terminal device of the operator to acquire an operation with minimum granularity that can be recognized by a human, such as a click operation or a key input of the operator.

FIG. 4 illustrates operations acquired by the collection unit 131, supplementary information on the operations, and examples of the acquisition target of the operation. Note that in a case where the operation is an operation on a web browser, the collection unit 131 also acquires an operation of browsing a web page or switching a tab of interest, in addition to a click operation or a key input.

For example, consider a case where an Alert window indicated by reference numeral 501 and a Search window indicated by reference numeral 502 illustrated in FIG. 5 are activated in the terminal device of the operator. In this case, the collection unit 131 acquires information indicated by reference numeral 503 as an operation log from the terminal device.

In the operation log indicated by reference numeral 503, a series of operations on the terminal device in which the operator sets the Alert window as the active window, selects displayed text 1.2.3.4, saves a character string on the clipboard by copying, switches the Search window to the active window, pastes the text saved on the clipboard, and clicks the submit button are recorded in time series.

The description returns to FIG. 2. The extraction unit 132 extracts and outputs a series of operations common to the operators from the operation log of each operator collected by the collection unit 131.

For example, the extraction unit 132 creates an operation sequence indicating a series of operations of each operator from the operation log of each operator. Then, the extraction unit 132 extracts a series of operations common to the operators by applying the longest common subsequence to the operation sequence of each operator.

For example, the extraction unit 132 creates an operation sequence 201 indicating a series of operations of the operators A, B, and C from the operation logs A, B, and C illustrated in FIG. 2. Then, the extraction unit 132 extracts a series of operations C common to the operators A, B, and C by applying the longest common subsequence to the operation sequence 201 of the operators A, B, and C.

For example, the extraction unit 132 first extracts a series of operations common to the operation sequences of the operators A and B by applying the longest common subsequence to the operation sequence of the operator A and the operation sequence of the operator B. Next, the extraction unit 132 extracts a series of operations C common to the operators A, B, and C by applying the longest common subsequence to the series of operations common to the operation sequences of the operators A and B and the operation sequence of the operator C.

Figure 6:
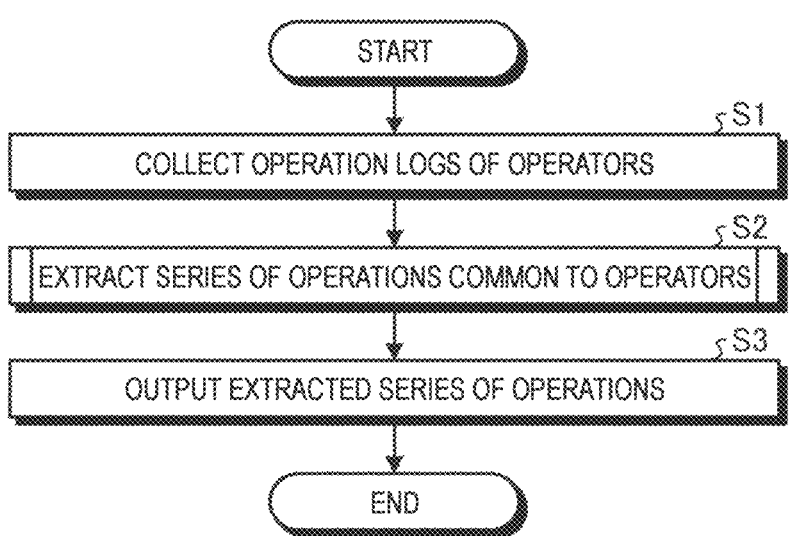
FIG. 6 is a flowchart illustrating an example of a processing procedure of the extraction device of FIG. 3.

[Example of processing procedure] Next, an example of a processing procedure of the extraction device 10 will be described with reference to FIG. 6. For example, the collection unit 131 of the extraction device 10 collects operation logs of the operators at the time of investigating a log of each device from terminal devices of the operators (S1). Next, the extraction unit 132 extracts a series of operations common to the operators on the basis of the operation logs collected in S1 (S2). Then, the extraction unit 132 outputs the series of operations extracted in S2 (S3).

Next, the processing of S2 in FIG. 6 will be described in detail with reference to FIG. 7. First, the extraction unit 132 performs abstraction processing on the operation logs collected by the collection unit 131 (S201).

For example, as indicated by reference numeral 801 in FIG. 8, the extraction unit 132 erases the time in the operation log, replaces a number with a code representing the number, or converts a selected character string into a code representing the character string type. As a result, for example, the operation log indicated on the left side of the reference numeral 802 is converted into the operation log indicated on the right side thereof.

Figure 7:
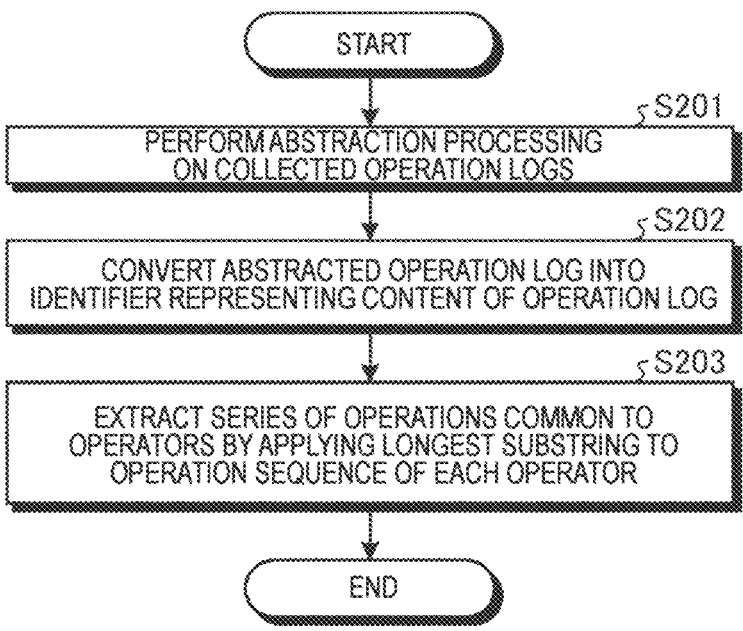
FIG. 7 is a flowchart illustrating an example of processing of S2 in FIG. 6.

After S201 in FIG. 7, the extraction unit 132 converts the operation log abstracted in S201 into an identifier representing the content of the operation log (S202 in FIG. 7).

For example, the extraction unit 132 converts an operation log illustrated on the left side of reference numeral 803 in FIG. 8 into an identifier illustrated on the right side thereof.

Through the above processing, the extraction unit 132 can obtain an operation sequence obtained by abstracting the operation performed by each operator from the operation log of each operator.

After S202 in FIG. 7, the extraction unit 132 extracts a series of operations common to the operators by applying the longest substring to the operation sequence of each operator (S203).

For example, the extraction unit 132 applies the longest substring (LCS) a plurality of times to the operation sequence of each of the operators A, B, and C illustrated in FIG. 9 to obtain a common operation sequence C. Then, the extraction unit 132 sets the common operation sequence C as a series of operations common to the operators A, B, and C.

In this way, the extraction device 10 can extract a series of operations for investigation, which is implicit knowledge among operators.

Second Embodiment In addition, an extraction device may extract a series of operations common to the operators by extracting an operation sequence for each n-gram from the operation sequence of each operator and obtaining a degree of commonality among the extracted n-gram operation sequences. The extraction device in this case will be described as the extraction device 10a (see FIG. 3) of the second embodiment. The same configurations as those of the first embodiment are denoted by the same reference numerals, and description thereof is omitted.

An example of a processing procedure of the extraction unit 132a in the extraction device 10a illustrated in FIG. 3 will be described with reference to FIG. 10. Since the processing in S211 and S212 in FIG. 10 is similar to the processing in S201 and S202 in FIG. 7, the description thereof will be omitted, and the processing from S213 in FIG. 10 will be described.

After S212, the extraction unit 132a extracts an operation sequence for each n-gram from the operation sequence of each operator (S213). Then, the extraction unit 132a calculates the degree of commonality of the n-gram operation sequences among the operators (S214). The extraction unit 132 repeats the processing of S213 and S214 with n=[a, b].

For example, in a case of n=[3, 3], the extraction unit 132a extracts an n-gram sequence illustrated on the left side of reference numeral 112 from the operation sequences of the operators A, B, and C illustrated in reference numeral 111 of FIG. 11. Then, the extraction unit 132a calculates a degree of commonality of the extracted n-gram sequences among the operators A, B, and C.

After S214 in FIG. 10, the extraction unit 132a extracts the n-gram operation sequence of which the degree of commonality calculated in S214 is equal to or greater than a threshold T as a series of operations common to the operators (S215).

For example, in a case where threshold T=1.0, the extraction unit 132a extracts operation sequences indicated by reference numeral 113 as a series of operations common to the operators A, B, and C from n-gram operation sequences indicated by reference numeral 112 in FIG. 11.

In this way, too, the extraction device 10a can extract a series of operations for investigation, which is implicit knowledge among operators.

Third Embodiment In addition, an extraction device may create a state transition model indicating a state transition of an operation from an operation sequence of each operator, and extract a regular expression of the created state transition model as a series of operations common to the operators. The extraction device in this case will be described as the extraction device 10b (see FIG. 3) of the third embodiment. The same configurations as those of the first embodiment and the second embodiment are denoted by the same reference numerals, and description thereof is omitted.

An example of a processing procedure of the extraction unit 132b in the extraction device 10b illustrated in FIG. 3 will be described with reference to FIG. 12. Since the processing in S221 and S222 in FIG. 12 are similar to the processing in S201 and S202 in FIG. 7, the description thereof will be omitted, and the processing from S223 in FIG. 12 will be described.

Figure 12:
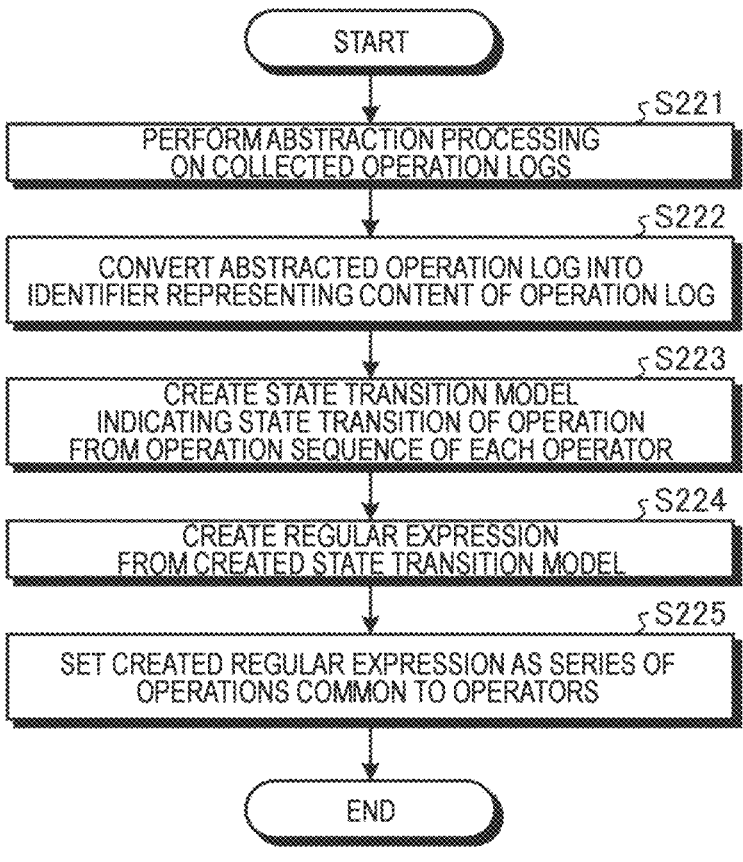
FIG. 12 is a flowchart illustrating an example of a processing procedure of an extraction device of a third embodiment.

After S222 in FIG. 12, the extraction unit 132b creates a state transition model indicating a transition state of the operation from the operation sequence of each operator (S223).

Figure 13:
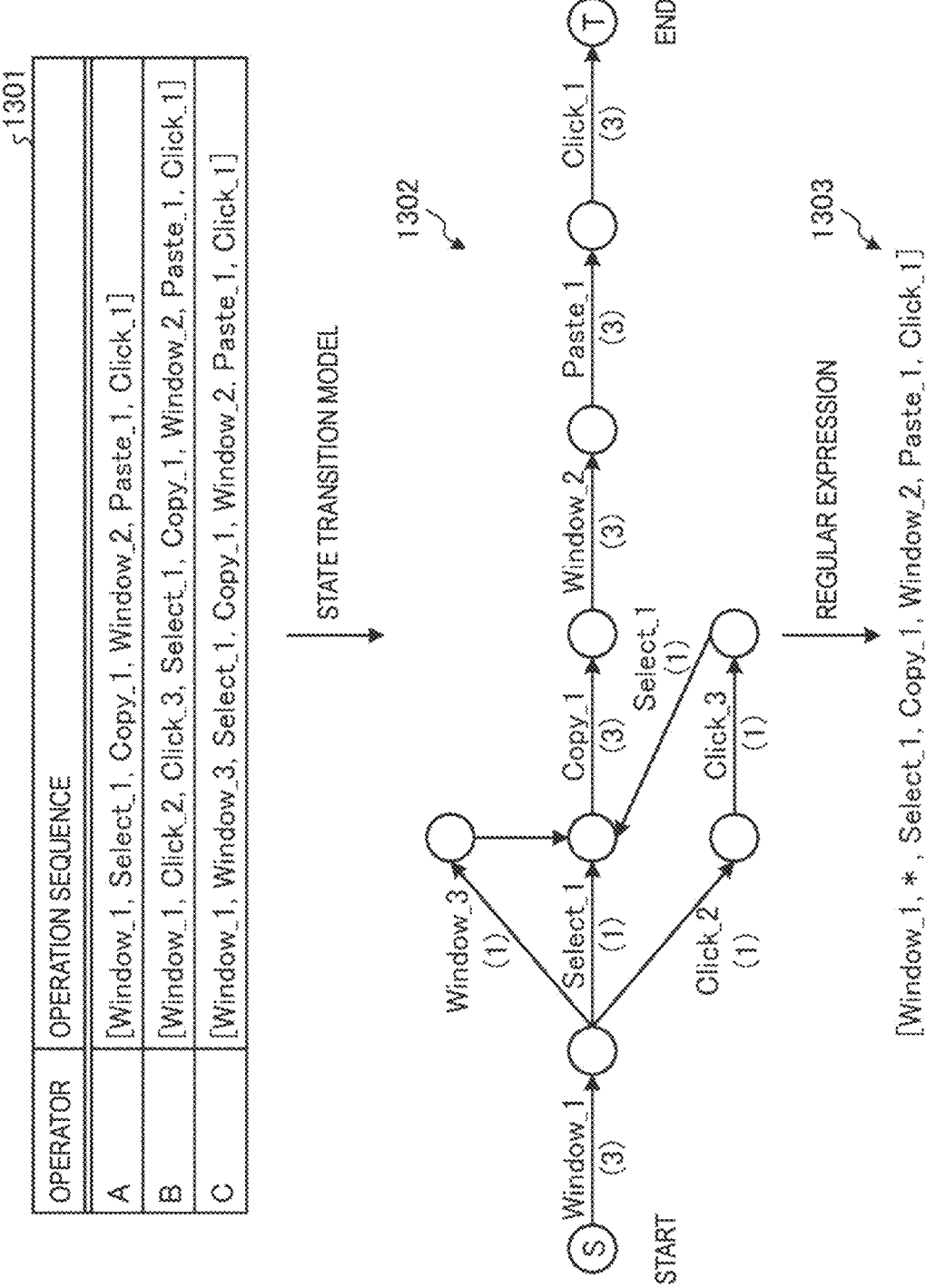
FIG. 13 is a diagram for describing an example of processing of the extraction device of the third embodiment.
Figure 14:
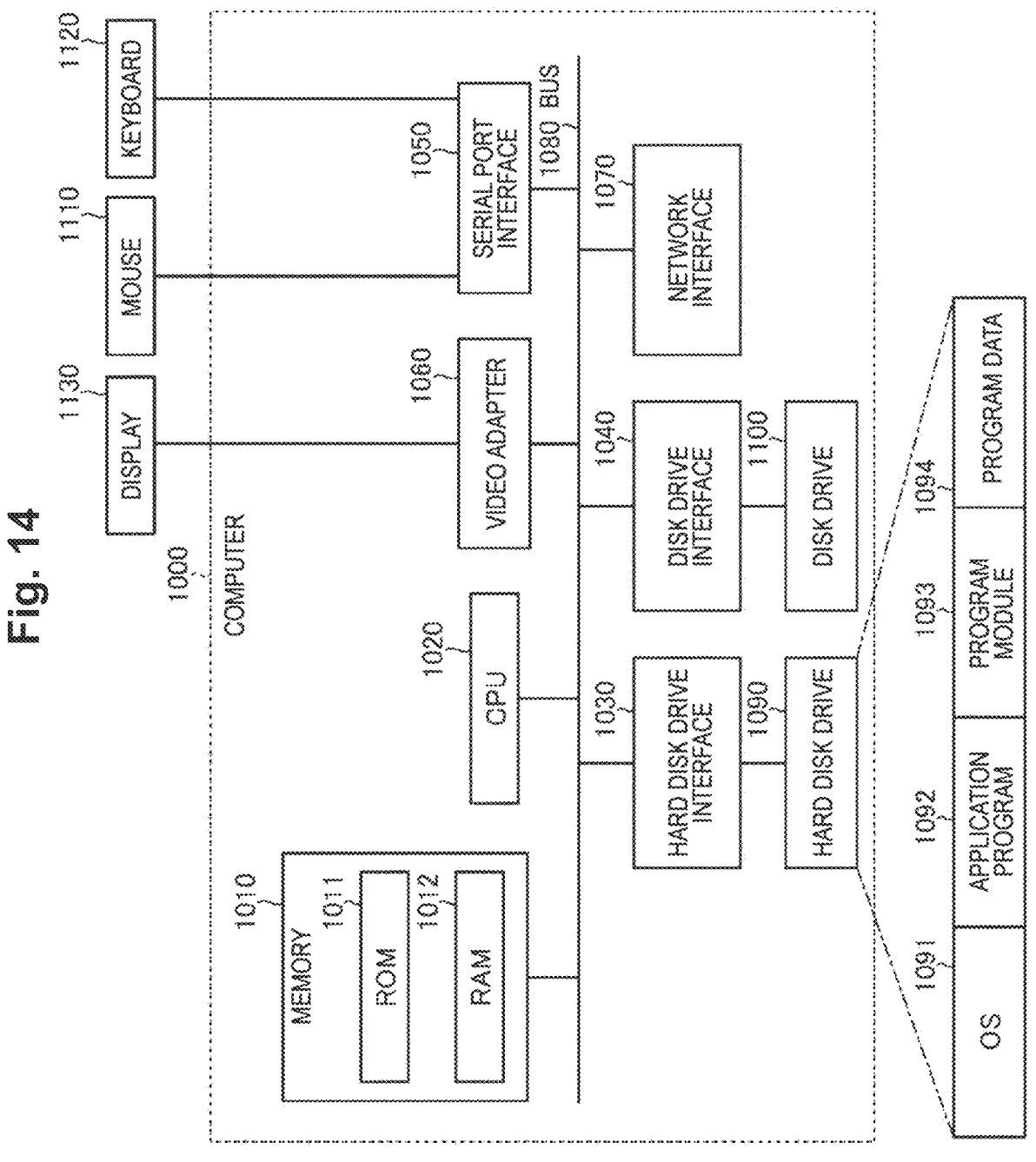
FIG. 14 is a diagram illustrating a configuration example of a computer that executes an extraction program.

For example, the extraction unit 132b creates a state transition model indicated by reference numeral 1302 from the operation sequences of the operators A, B, and C indicated by reference numeral 1301 in FIG. 13.

After S223 in FIG. 12, the extraction unit 132b creates a regular expression from the state transition model created in S223 (S224). Then, the extraction unit 132b sets the regular expression created in S224 as a series of operations common to the operators (S225).

For example, the extraction unit 132b extracts a common operation indicated by reference numeral 1303 in a manner of creating a regular expression from a state transition model indicated by reference numeral 1302 in FIG. 13. Note that "*" in the regular expression indicated by reference numeral 1302 represents that it can take any value.

In this way, too, the extraction device 10b can extract a series of operations for investigation, which is implicit knowledge between operators.

[System configuration and other] In addition, each component of each unit illustrated is functionally conceptual, and does not have to be physically configured as illustrated in the drawings. That is, a specific form of distribution and integration of individual devices is not limited to the illustrated form, and all or a part thereof can be functionally or physically distributed and integrated in any unit according to various loads, usage conditions, and the like. Furthermore, all or any part of each processing function performed in each device can be implemented by a CPU and a program executed by the CPU, or can be implemented as hardware by wired logic.

In addition, among the processing described in the above embodiments, all or a part of processing described as being automatically performed may be manually performed, or all or a part of processing described as being manually performed may be automatically performed by a known method. In addition, the processing procedure, the control procedure, the specific name, and the information including various types of data and parameters that are illustrated in the document and the drawings can be freely changed unless otherwise specified.

[Program] The functions of the extraction device 10, 10a, 10b can be implemented by installing a program in a desired computer as package or online software. For example, by causing an information processing device to execute the program, the information processing device can function as the extraction device 10, 10a, 10b of the embodiments. The information processing device mentioned here includes a desktop or a notebook personal computer. In addition, the information processing device also includes a mobile communication terminal such as a smartphone, a mobile phone, and a personal handyphone system (PHS), a terminal such as a personal digital assistant (PDA), and the like.

In addition, the extraction device 10, 10*a*, 10*b* can also be implemented as a server device with a user's terminal device as a client which provides the client with a service related to the above processing. In this case, the server device may be implemented as a web server, or may be implemented as a cloud that provides services related to the above processing by outsourcing.

FIG. 10 is a diagram illustrating an example of the computer that executes an extraction program. A computer 1000 includes, for example, a memory 1010 and a CPU 1020. In addition, the computer 1000 also includes a hard disk drive interface 1030, a disk drive interface 1040, a serial port interface 1050, a video adapter 1060, and a network interface 1070. These units are connected to each other by a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected with, for example, a display 1130.

The hard disk drive 1090 stores, for example, an OS 1091, an application program 1092, a program module 1093, and program data 1094. That is, a program that defines each processing executed by the extraction device 10, 10*a*, 10*b* is implemented as the program module 1093 in which a code executable by the computer is described. The program module 1093 is stored in, for example, the hard disk drive 1090. For example, the program module 1093 for executing processing similar to the functional configuration in the extraction device 10, 10*a*, 10*b* is stored in the hard disk drive 1090. Note that the hard disk drive 1090 may be replaced with an SSD.

In addition, each piece of data used in the processing of the above-described embodiment is stored, for example, in the memory 1010 or the hard disk drive 1090 as the program data 1094. Then, the CPU 1020 reads the program module 1093 and the program data 1094 stored in the memory 1010 or the hard disk drive 1090 to the RAM 1012, and executes the program module 1093 and the program data 1094 as necessary.

Note that the program module 1093 and the program data 1094 are not limited to being stored in the hard disk drive 1090, and may be stored in, for example, a detachable storage medium and read by the CPU 1020 via the disk drive 1100 or the like. Alternatively, the program module 1093 and the program data 1094 may be stored in another computer connected via a network (local area network (LAN), wide area network (WAN), or the like). Then, the program module 1093 and the program data 1094 may be read by the CPU 1020 from the other computer via the network interface 1070.

REFERENCE SIGNS LIST

10, 10*a*, 10*b* Extraction device
11 Input/output unit
12 Storage unit

13 Control unit
131 Collection unit
132 Extraction unit

The invention claimed is:

1. An extraction device comprising:
processing circuitry configured to:
    collect, from an operating system (OS) of a computer operated by each of different human operators, an operation log indicating operations of the computer of each of the different human operators when each of the different human operators operates the computer to conduct an investigation;
    extract a series of operations common to the different human operators from the collected operation logs of the different human operators; and
    output the extracted series of operations.

2. The extraction device according to claim 1, wherein the processing circuitry is further configured to extract the series of operations common to the different human operators by applying a longest common subsequence to an operation sequence indicating a series of operations of each of the different human operators.

3. The extraction device according to claim 1, wherein the processing circuitry is further configured to;
    extract an operation sequence for each n-gram from an operation sequence indicating a series of operations of each of the different human operators, and
    extract, from among extracted n-gram operation sequences, an n-gram operation sequence having a degree of commonality among the different human operators of equal to or greater than a predetermined threshold as the series of operations common to the different human operators.

4. The extraction device according to claim 1, wherein the processing circuitry is further configured to:
    create a state transition model indicating a state transition of the operation from an operation sequence indicating a series of operations of each of the different human operators, and
    set a regular expression created from the created state transition model as the series of operations common to the different human operators.

5. The extraction device according to claim 1, wherein the processing circuitry is further configured to collect the operation log using a window function of the operating system to acquire operations recognizable by a human.

6. The extraction device according to claim 1, wherein the operation log includes a time-series record of operations performed by each different human operator on the computer.

7. The extraction device according to claim 1, wherein the processing circuitry is further configured to abstract the collected operation logs by replacing a number with a code representing the number or converting a selected character string into a code representing a character string type.

8. The extraction device according to claim 7, wherein the processing circuitry is further configured to convert the abstracted operation logs into identifiers representing content of the operation logs.

9. The extraction device according to claim 1, wherein the operation log includes at least two of a click, a key input, and a window interaction.

10. The extraction device according to claim 1, wherein the operation log includes at least two of setting a first window as an active window, selecting displayed text, copying a character string, setting a second window as the active window, pasting the character string, clicking a submit button, browsing a web page, and switching a tab of interest.

11. The extraction device according to claim 1, wherein the operation log includes at least three of setting a first window as an active window, selecting displayed text, copying a character string, setting a second window as the active window, pasting the character string, clicking a submit button, browsing a web page, and switching a tab of interest.

12. The extraction device according to claim 1, wherein the operation log includes at least four of setting a first window as an active window, selecting displayed text, copying a character string, setting a second window as the active window, pasting the character string, clicking a submit button, browsing a web page, and switching a tab of interest.

13. The extraction device according to claim 1, wherein the operation log includes at least five of setting a first window as an active window, selecting displayed text, copying a character string, setting a second window as the active window, pasting the character string, clicking a submit button, browsing a web page, and switching a tab of interest.

14. The extraction device according to claim 1, wherein the operation log includes at least six of setting a first window as an active window, selecting displayed text, copying a character string, setting a second window as the active window, pasting the character string, clicking a submit button, browsing a web page, and switching a tab of interest.

15. The extraction device according to claim 1, wherein extract the series of operations common to the different human operators from the collected operation logs of the different operators includes analyzing sequences of the operations to find patterns common to the different operators.

16. The extraction device according to claim 1, wherein the investigation is an investigation into a security breach.

17. The extraction device according to claim 1, wherein the investigation is an investigation into a network failure.

18. An extraction method executed by an extraction device, the extraction method comprising:

collecting, from an operating system (OS) of a computer operated by each of different human operators, an operation log indicating operations of the computer of each of the different human operators when each of the different human operators operates the computer to conduct an investigation;

extracting a series of operations common to the different human operators from the collected operation logs of the different human operators; and outputting the extracted series of operations.

19. A non-transitory computer-readable recording medium storing therein an extraction program that causes a computer to execute a process comprising:

collecting, from an operating system (OS) of a computer operated by each of different human operators, an operation log indicating operations of the computer of each of the different human operators when each of the different human operators operates the computer to conduct an investigation;

extracting a series of operations common to the different human operators from the collected operation logs of the different human operators; and outputting the extracted series of operations.

\* \* \* \* \*